(12) United States Patent
Ghosh et al.

(10) Patent No.: US 9,074,959 B2
(45) Date of Patent: Jul. 7, 2015

(54) METHOD FOR EVALUATING THE ACCURACY AND REPEATABILITY OF LEAK TESTING INSTRUMENTS

(75) Inventors: Ranajit Ghosh, Novi, MI (US); Sunil Nandwani, Troy, MI (US); John S. Agapiou, Rochester Hills, MI (US); Paul W. Tanis, Spring Hill, TN (US)

(73) Assignee: GM Global Technology Operations, LLC, Detroit, MI (US)

( * ) Notice: Subject to any disclaimer, the term of this patent is extended or adjusted under 35 U.S.C. 154(b) by 364 days.

(21) Appl. No.: 13/593,773

(22) Filed: Aug. 24, 2012

(65) Prior Publication Data

US 2014/0053636 A1 Feb. 27, 2014

(51) Int. Cl.
*G01M 3/00* (2006.01)

(52) U.S. Cl.
CPC .................................. *G01M 3/007* (2013.01)

(58) Field of Classification Search
CPC ....... G01M 3/329; G01M 3/36; G01M 3/007; G01L 27/00; A61B 5/02156; F02D 41/222
USPC ................. 73/40, 49.8, 49.3, 49.7, 1.57, 1.01
See application file for complete search history.

(56) References Cited

U.S. PATENT DOCUMENTS

| | | | | |
|---|---|---|---|---|
| 4,343,176 A | * | 8/1982 | Basford et al. | 73/1.04 |
| 5,675,506 A | * | 10/1997 | Savic | 702/51 |
| 6,112,578 A | * | 9/2000 | Black et al. | 73/40 |
| 6,640,614 B1 | * | 11/2003 | Bode et al. | 73/37 |
| 6,666,070 B1 | * | 12/2003 | Hagg et al. | 73/38 |
| 2007/0256478 A1 | * | 11/2007 | Guadagnola et al. | 73/40 |
| 2012/0079873 A1 | * | 4/2012 | Jackson et al. | 73/49.3 |

* cited by examiner

*Primary Examiner* — Herzon E Williams
*Assistant Examiner* — Truong Phan

(57) ABSTRACT

A method of determining the accuracy and repeatability of leak testing instrumentation comprises the following steps: providing a two chamber vessel having an access port and a flow controlling reference orifice associated with each chamber and a third reference orifice communicating between the two chambers, providing a leak testing device and connecting such leak testing device first to one of such ports, pressurizing the associated chamber and, with the associated orifice open, observing and recording the pressure measured by the leak testing device under test as a function of time. The second test repeats this activity with the other chamber and the other orifice. A third test is undertaken with the third orifice open. One of the chambers is smaller and incorporates a smaller orifice and the other chamber is larger and incorporates a larger orifice thus achieving leak testing under different conditions.

17 Claims, 2 Drawing Sheets

Figure 1:
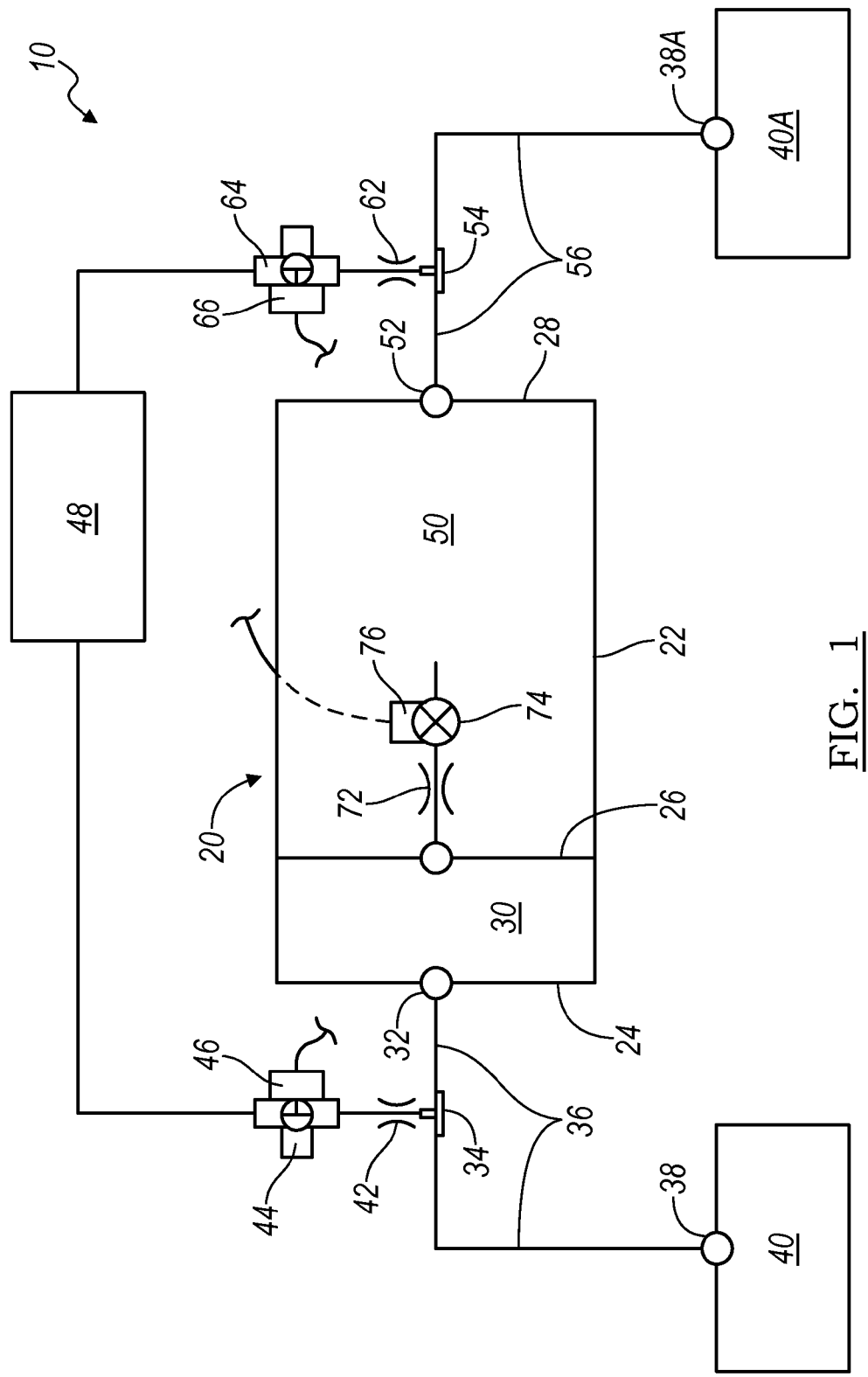

METHOD FOR EVALUATING THE ACCURACY AND REPEATABILITY OF LEAK TESTING INSTRUMENTS

FIELD

The present disclosure relates to leak testing instrumentation and more particularly to a method of objectively testing leak testing instrumentation, determining its performance and accepting or rejecting same.

BACKGROUND

The statements in this section merely provide background information related to the present disclosure and may or may not constitute prior art.

Leak testing of industrial, commercial and consumer devices and components is a sophisticated and necessary adjunct to manufacture. Broadly speaking, the testing is part of quality control and its results can be critical not only to the successful manufacture of components but also to their performance and achieving their intended service life. That a given hydraulic pump, solenoid valve, hydraulic cylinder, or complex hydraulic device such as a vehicle transmission operates properly and provides the desired output can often depend upon the integrity of many components such as valve plungers and seals or, stated oppositely, the leakage rate of such parts and of the composite device.

When such devices are tested for their component and seal integrity (leak rate), it is necessary to employ leakage testers which utilize pressurizing mechanisms such as pumps, pressure sensing devices and data processors which compute the leak rate of the tested component. Typically, a part or component will be rejected if the leak rate is above a certain, predetermined threshold and will be accepted if the leak rate is below another certain, predetermined threshold.

This activity raises the question of how the leak sensing equipment itself is calibrated or tested since an improperly operating leak tester generally does not include self-diagnostic components or programs and it may indicate improper pass-fail test results initially or for a period of time before it is checked, found to be out of calibration and re-calibrated. Furthermore, since different equipment from different manufacturers which was designed for different leak tests may not be accurately and identically calibrated, it becomes advisable to standardize such testing and calibration to ensure satisfactory, consistent and repeatable test results and product integrity regardless of the equipment utilized to perform a leak test.

The present invention is directed to a method addressing the foregoing difficulties.

SUMMARY

The present invention provides a method of determining the accuracy and repeatability and thus the acceptability of leak testing instrumentation comprising the following steps: providing a two chamber vessel having an access port and a flow controlling reference orifice associated with each chamber and a third reference orifice communicating between the two chambers, providing a leak testing device and connecting such leak testing device first to one of such ports, pressurizing the associated chamber and, with the associated orifice open, observing and recording the pressure measured by the leak testing device under test as a function of time, that is, the leak rate. The second test repeats this activity with the other chamber and the other orifice. A third test is undertaken with the third orifice open. One of the chambers is smaller and incorporates a smaller orifice and the other chamber is larger and incorporates a larger orifice thus achieving leak testing under different conditions, i.e., pressures and flow rates. The tests may be repeated many times to check the repeatability of a leak testing device. The testing may also be conducted at temperatures slightly above ambient.

Thus it is an aspect of the present invention to provide a two chamber vessel having a respective port and a flow controlling reference orifice associated with each chamber It is a further aspect of the present invention to provide a two chamber vessel having a port and a flow controlling reference orifice associated with each chamber and a third reference orifice selectively communicating between the two chambers.

It is a still further aspect of the present invention to provide a method for determining the performance of a leak testing device.

It is a still further aspect of the present invention to provide a method for determining the performance of a leak testing device and determining its acceptability for use.

It is a still further aspect of the present invention to provide a method for determining the performance of a leak testing device and accepting or rejecting it.

It is a still further aspect of the present invention to provide a method of testing a leak detection device at multiple pressures and flow rates.

It is a still further aspect of the present invention to provide a method of testing the repeatability of a leak detection device.

It is a still further aspect of the present invention to provide a method of testing a leak detection device at temperatures slightly above ambient.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
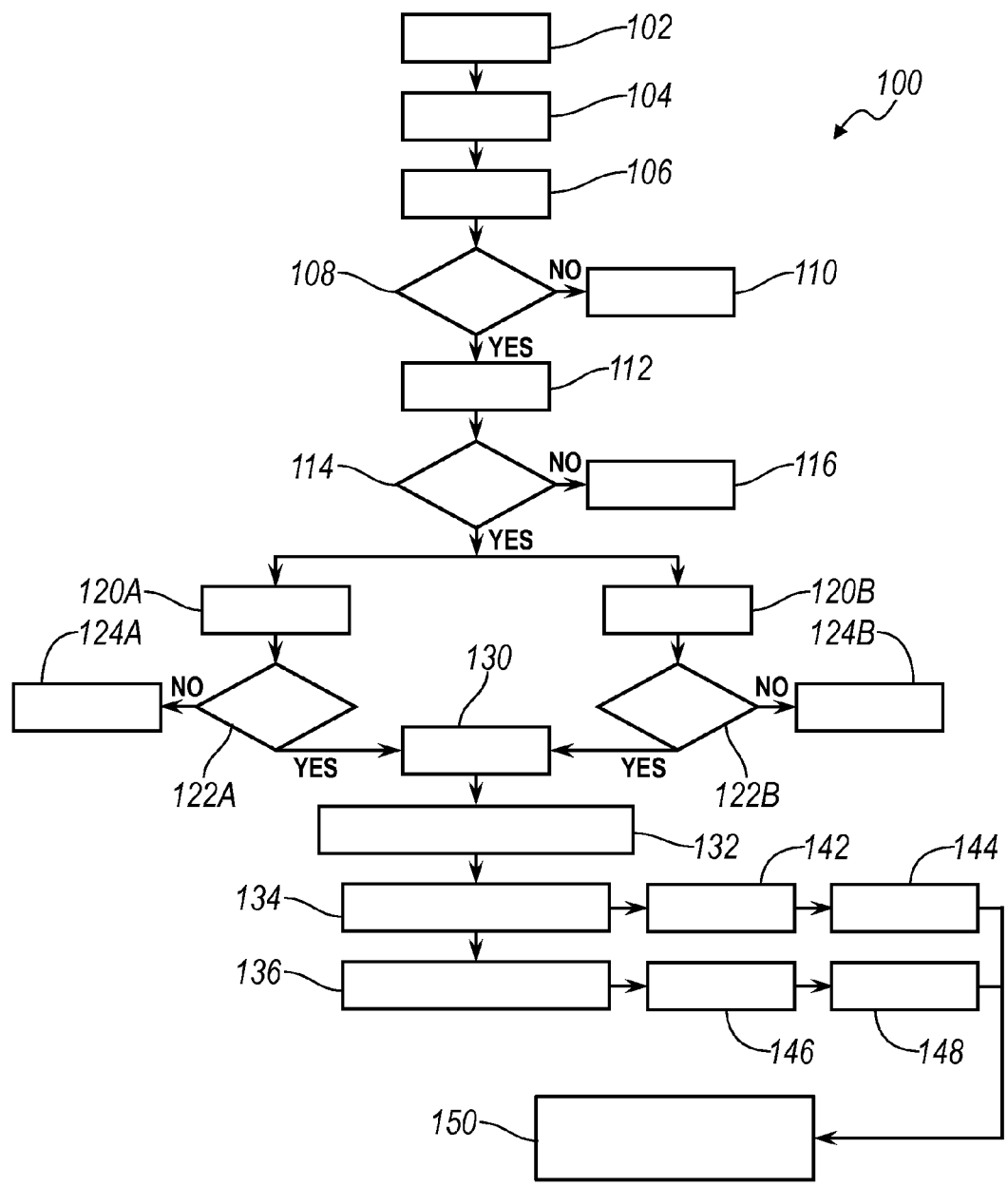

FIG. 1 is a schematic view of a test arrangement utilizing a two chamber vessel according to the present invention; and FIG. 2 is a flow chart setting forth the steps of a method of determining the performance and acceptability of leak detection devices and instruments according to the present invention.

DETAILED DESCRIPTION

The following description is merely exemplary in nature and is not intended to limit the present disclosure, application, or uses.

With reference to FIG. 1, a general arrangement of a test apparatus is schematically illustrated and generally designated by the reference number 10. The test apparatus 10 includes a two chamber leak test container or vessel 20 which is preferably a cylinder having an outside wall 22, a first circular end wall 24, a bulkhead 26 and a second circular end wall 28. The outside wall 22, the first end wall 24 and the bulkhead 26 define a first, smaller chamber 30 which preferably has a volume of 200 cubic centimeters (12.20 cubic inches or 0.0528 gallons). A first fitting 32 provides access to the first chamber 30 through the first end wall 24. The outside wall 22, the bulkhead 26 and the second end wall 28 define a second chamber 50 which preferably has a volume of 1 gallon (3.79 liters or 231 cubic inches). A second fitting 52 provides access to the second chamber 50 through the second end wall 28.

Disposed adjacent the bulkhead 26 and selectively providing fluid communication between the first chamber 30 and second chamber 50 is a bulkhead or third orifice 72. The bulkhead or third orifice 72 is preferably a fixed, pre-determined and pre-selected size which provides a flow (leak) rate of 160 standard cubic centimeters of air per minute at a pressure of 15 p.s.i. (103.4 kPa). The bulkhead or third orifice 72 is disposed in series with a two position (on-off) valve 74 such that the valve 74 may be opened to provide fluid communication between the first chamber 30 and the second chamber 50 through the bulkhead or third orifice 72 or closed to terminate and prevent such fluid communication. Preferably, the two position valve 74 is operated by an electric motor or solenoid 76 but the valve 74 may also be pneumatically or hydraulically operated.

The first fitting 32 is in fluid communication with one (a first) port of a first T fitting 34 through suitable tubing or a fluid line 36. It will be appreciated that the fittings 32 and 34 as well as all the other fittings, the tubing or fluid line 36 as well as all the other tubing or fluid lines, such as the tubing or fluid line 56, and the valves, such as the two position valve 72, are relatively large compared to the control orifices so that they have negligible or no effect on the testing performed with the apparatus 10. Another (second) port of the first T fitting 34 communicates through such tubing 36 to a sensing port 38 of a leak testing device or instrument 40 which is undergoing a first portion (high pressure) testing with the present test apparatus 10. Yet another (third) port of the first T fitting 34 communicates with a first orifice 42. The first orifice 42 is sized to provide a defined and known leak rate of 1.2 standard cubic centimeters of air per minute at an initial pressure of 15 p.s.i. (103.4 kPa).

In fluid communication with the yet another (third) port of the first T fitting 34 through the first orifice 42 and a first three way valve 44 is a source of pressurized air 48. The first three way valve 44 is preferably operated by an electric motor or solenoid 46 but may also be operated manually, pneumatically or hydraulically. The source of pressurized air provides dry air at 15 p.s.i. (103.4 kPa) gauge. The first three way valve 44 may be positioned or adjusted, as illustrated in FIG. 1, to provide pressurized air to the first orifice 42, the first T fitting 34, the leak testing device 40 and the first chamber 30. The first three way valve 44 may also be positioned or adjusted to terminate the flow of pressurized air from the source 48 and allow the first chamber 30 and the leak tester 40 to vent through the first orifice 42. Preferably, as noted above, the first three way valve 44 is relatively large in size, i.e., having large internal passageways, so that it has negligible or no effect on the flow rate established and controlled by the first orifice 42.

The second fitting 52 which is disposed on the second end wall 28 of the vessel 20 is in fluid communication with one (a first) port of a second T fitting 54 through suitable tubing or a fluid line 56. Another (second) port of the second T fitting 54 communicates through such tubing 56 to a sensing port 38A of a leak tester 40A which is undergoing a second portion (low pressure) testing with the present test apparatus 10. Typically, the leak testing device or instrument 40A will be the same leak testing device 40 previously tested with the first, smaller chamber 30 and the first orifice 42 although it should be apparent that it may be another leak testing device 40A undergoing low pressure testing. Yet another (third) port of the second T fitting 54 communicates with a second orifice 62. The second orifice 62 is sized to provide a defined and known leak rate of 20 standard cubic centimeters of air per minute at an initial pressure of 15 p.s.i. (103.4 kPa). Additionally, a second three way valve 64 is in fluid communication between the yet another (third) port of the second T fitting 54 and the source of compressed air 48. The second three way valve 64 is preferably operated by an electric motor or solenoid 66 but may also be operated manually, pneumatically or hydraulically. The second three way valve 64 operates in the same manner and provides the same functionality with the second orifice 62 as the first three way valve 44 does with the first orifice 42.

Referring now to FIGS. 1 and 2, a flow chart presenting the test procedure to determine the suitability (acceptability) of a piece of leak testing device or instrument 40 is illustrated and generally designated by the reference number 100. Preferably, the test procedure 100 takes place at 65° F. to 75° F. (18° C. to 24° C.) ambient temperature and 40% to 70% relative humidity. The test procedure 100 begins with a start or initialization step 102 and moves to a step 104 which determines and/or sets the optimum leak test cycle time. Since these leak tests will be repeated many times, it is important and beneficial that a nominal total time be determined for one cycle of the leak test. That is, if the to-be-performed leak test nominally requires 30 seconds, setting the equipment cycle time at 5 minutes not only simply wastes equipment and personnel time but also delays the results of the testing. Contrariwise, if a particular leak test requires one minute to complete, setting the cycle time to any value less than that is obviously a grave error. In a following process step 106, the desired leak tests with the three orifices 42, 62 and 72 providing three distinct leak rates, are performed.

In a decision point 108, the three readings (volume per unit of time) on the leak testing device or instrument 40 under test are compared to the three known leak values (1.2 sccm through the first orifice 42, 20 sccm through the second orifice 62 and 160 sccm through the bulkhead orifice 72). If the three values determined by the leak testing device 40 under test are within 5%, that is, within plus or minus 5%, of these values, the leak testing device 40 is determined capable or acceptable and the decision point 108 is exited at YES. If any of the three values determined by the leak testing device 40 under test are not within 5% of the predetermined values, the decision point 108 is exited at NO and the leak tester 40 is rejected in a process step 110 as being unacceptable and incapable of proper leak testing.

Next a process step 112 is executed wherein the data relating to the first orifice 42 and the second orifice 62 is evaluated with the bulkhead or third orifice 72 engaged or closed. Then a decision point 114 is entered and it is determined whether the leak testing device or instrument 40 under test has provided results that are within 5%, that is, within plus or minus 5%, of the leak rate of the first orifice 42 and of the second orifice 62. If either of the results is not within this tolerance, the decision point 114 is exited at NO and the leak testing device or instrument 40 is rejected in a process step 116 as being unacceptable and incapable of proper leak testing. If the results are within the 5% tolerance, the decision point 114 is exited at YES and the leak testing device 40 is determined capable or acceptable.

The process 100 now splits into two parallel paths which are both performed and may be performed in either order before joining or returning to a single path. To the left is a process step 120A which is referred to as a Type 1 high pressure study utilizing only the first chamber 30 and the first orifice 42. This study is repeated fifty (50) times and when completed the values of Q1c and $C_{gk1}$ are calculated. Q1c is simply the average of the fifty test runs and $C_{gk1}$ is the gage capability index which is a measure of the accuracy and repeatability of a system, in this case the leak testing device 40. $C_{gk1}$ can be defined as $$C_{gk} = \frac{0.1 \cdot RF - |\bar{x}_g - x_m|}{3s_g}$$

where $$\bar{x}_g = \frac{1}{n} \cdot \sum_{i=1}^{n} x_i$$

and $$s_g = \sqrt{\frac{1}{n-1} \sum_{i=1}^{n} (x_i - \bar{x}_g)^2}$$

The Xg (bar) term is the average flow (Q1avg) or Q1c. Xm is the specified value for the orifice 42 for the chamber 30 in the test. RF is the process tolerance or the Q1c. Xi is the flow of the individual measurements (i is 1 through 50 measurements).

A decision point 122A is then entered which determines whether $C_{gk1}$ is greater than 1.6. If it is not, the decision point 122A is exited at NO because the leak testing device 40 under test is incapable of performing accurate high pressure leak tests repeatedly and is therefore unacceptable as indicated at step 124A. If the value $C_{gk1}$ is greater than 1.6, the decision point 122A is exited at YES because the leak testing device 40 under test is capable of performing accurate high pressure leak tests repeatedly and is therefore acceptable.

Returning to the split in the process 100, to the right is a process step 120B which is referred to as a Type 1 low pressure study utilizing only the second chamber 50 and the second orifice 62. This study is repeated fifty (50) times and when completed the values of Q2c and $C_{gk2}$ are calculated. Q2c (Q2avg) is simply the average of the fifty test runs and $C_{gk2}$ is the gage capability index which, as noted above, is a measure of the accuracy and repeatability of a system, in this case the leak testing device or instrument 40. A decision point 122B is then entered which determines whether $C_{gk2}$ is greater than 1.6. If it is not, the decision point 122B is exited at NO because the leak testing device 40 under test is incapable of performing accurate low pressure leak tests repeatedly and is therefore unacceptable as indicated at step 124B. If the value $C_{gk2}$ is greater than 1.6, the decision point 122B is exited at YES because the leak testing device 40 under test is capable of performing accurate low pressure leak tests repeatedly and is therefore acceptable.

The process then moves to a common process step 130 which commences evaluation of the leak testing device or instrument 40 at varying room (ambient) temperatures. First, a process step 132 is encountered which heats the leak test vessel 20 to at least 10° F. (5.5° C.) above room (ambient) temperature. When the leak test vessel 20 is so heated, a process step 134 is entered in which three high pressure tests with the first (high pressure) chamber 30, utilizing the first orifice 42, with a one minute dwell or delay between each test, are performed. Finally, a second, similar process step 136 is entered in which three low pressure tests with the second (low pressure) chamber 50, utilizing the second orifice 62, with a one minute dwell or delay between each test, are performed.

Data is collected from each of the process steps 134 and 136 and, returning to the process step 134, such data from the three high pressure tests is utilized to calculate Q tHp in a process step 142 and L capH in a process step 144. Q tHp is obtained in the Type 1 high pressures tests of step 122A and L capH is calculated from the equation $$L_{cap} = (\text{cycle time}/C_{gk}) \times [1 + |Q_t - Q_{avg}|/(Q_{avg})]$$

where Q avg is the average of the fifty runs performed in steps 122A and 122B, Q t is the high or low pressure value referenced directly above and the cycle time is in seconds. Similarly, data from the process step 136 is utilized in a process step 146 to calculate Q tLp and, in a process step 148, to calculate L capL. These four values (Q tHp, L capH, Q tLp and L capL) are utilized in a process step 150 to compare the performance of various instruments 40 which have undergone testing according to the just described sequence with the above-described equipment for selection purposes. That is, certain leak testing devices 40 or leak testing devices 40 from certain manufacturers may always prove to be superior and thus acceptable, others may prove to be acceptable under certain conditions and still others may never provide proper results and thus be unacceptable for any purpose or use.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of evaluating a leak testing instrument comprising the steps of:
   providing a two chamber vessel having a first, smaller chamber and a second, larger chamber,
   providing a first orifice to control flow out of said first chamber and a second orifice to control flow out of said second chamber,
   connecting a sensing port of a leak testing instrument with said first, smaller chamber and said first orifice, pressurizing said first chamber and utilizing said leak testing instrument to monitor pressure drop versus time in said first chamber, and connecting said sensing port of said leak testing instrument with said second, larger chamber and said second orifice, pressurizing said second chamber and utilizing said leak testing instrument to monitor pressure drop versus time in said second chamber, wherein said first orifice is smaller and provides a slower leak rate and said second orifice is larger and provides a faster leak rate.

2. The method of evaluating a leak testing instrument of claim 1 further including the step of providing a third orifice to control flow between said first chamber and said second chamber connecting said sensing port of said leak testing instrument with said second, larger chamber and said second orifice and utilizing said leak testing instrument to monitor pressure drop versus time in said second chamber.

3. The method of evaluating a leak testing instrument of claim 1 wherein said first and said second chambers are repeatedly pressurized to approximately 15 p.s.i.

4. The method of evaluating a leak testing instrument of claim 3 wherein a gage capability index is computed for said repeated pressurizations.

5. The method of evaluating a leak testing instrument of claim 1 further including the step of heating said two chamber vessel to at least 10° F. above ambient temperature.

6. The method of evaluating a leak testing instrument of claim 1 further including the step of accepting said leak testing instrument based upon satisfactory performance of such testing.

7. A method of evaluating a leak testing instrument comprising the steps of:

providing a first, smaller chamber and a second, larger chamber, providing a first orifice to control flow out of said first chamber, a second orifice to control flow out of said second chamber and a third orifice and a control valve to control flow between said first and said second chambers, connecting a sensing port of a leak testing instrument with said first, smaller chamber and said first orifice, pressurizing said first chamber and utilizing said leak testing instrument to monitor pressure drop versus time in said first chamber, connecting said sensing port of said leak testing instrument with said second, larger chamber and said second orifice, pressurizing said second chamber and utilizing said leak testing instrument to monitor pressure drop versus time in said second chamber, and connecting said sensing port of said leak testing instrument with said second, larger chamber and said second orifice, opening said control valve, pressurizing said first and second chambers and utilizing said leak testing instrument to monitor pressure drop versus time in said second chamber.

8. The method of evaluating a leak testing instrument of claim 7 further including the step of heating said two chambers to at least 10° F. above ambient temperature.

9. The method of evaluating a leak testing instrument of claim 7 further including the step of accepting said leak testing instrument based upon satisfactory performance of such testing.

10. The method of evaluating a leak testing instrument of claim 7 wherein said first orifice is smaller and provides a slower leak rate and said second orifice is larger and provides a faster leak rate.

11. The method of evaluating a leak testing instrument of claim 10 wherein said third orifice is larger than said second orifice and said first orifice and provides a fastest leak rate.

12. The method of evaluating a leak testing instrument of claim 7 wherein said first and said second chambers are repeatedly pressurized to approximately 15 p.s.i. and a gage capability index is computed for said repeated pressurizations.

13. A method of evaluating a leak testing device comprising the steps of:

providing a container having a first, smaller chamber and a second, larger chamber, providing a first orifice to control flow out of said first chamber, a second orifice to control flow out of said second chamber and a third orifice and a control valve to permit and inhibit flow between said first and said second chambers, connecting a sensing port of a leak testing device with said first, smaller chamber and said first orifice, pressurizing said first chamber and utilizing said leak testing device to monitor pressure drop versus time in said first chamber, connecting said sensing port of said leak testing device with said second, larger chamber and said second orifice, pressurizing said second chamber and utilizing said leak testing device to monitor pressure drop versus time in said second chamber, and connecting said sensing port of said leak testing device with said second, larger chamber and said second orifice, opening said control valve, pressurizing said first and second chambers and utilizing said leak testing device to monitor pressure drop versus time in said second chamber.

14. The method of evaluating a leak testing device of claim 13 wherein said first and said second chambers are repeatedly pressurized to approximately 15 p.s.i. and a gage capability index is computed for such repeated pressurizations.

15. The method of evaluating a leak testing device of claim 13 further including the step of heating said two chamber vessel to at least 10° F. above ambient temperature.

16. The method of evaluating a leak testing device of claim 13 further including the step of accepting said leak testing device based upon satisfactory performance of such testing.

17. The method of evaluating a leak testing device of claim 13 wherein said third orifice is larger than said second orifice and said first orifice and provides a fastest leak rate.

* * * * *